United States Patent [19]
Ellwood et al.

[11] Patent Number: 5,879,810
[45] Date of Patent: Mar. 9, 1999

[54] COMPOSITE ARTICLES

[75] Inventors: Michael Ellwood, Rochdale; Stephen William Leeming, Manchester, both of United Kingdom

[73] Assignee: Zeneca Limited, London, England

[21] Appl. No.: 669,487

[22] PCT Filed: Dec. 16, 1994

[86] PCT No.: PCT/GB94/02750

§ 371 Date: Jul. 11, 1996

§ 102(e) Date: Jul. 11, 1996

[87] PCT Pub. No.: WO95/19260

PCT Pub. Date: Jul. 20, 1995

[30] Foreign Application Priority Data

Jan. 17, 1994 [GB] United Kingdom .................. 9400805

[51] Int. Cl.$^6$ ............................................. B32B 15/08
[52] U.S. Cl. ................. 428/416; 428/425.8; 428/624; 428/626; 428/650; 428/684; 156/60; 156/325; 156/327; 156/330; 156/331.7
[58] Field of Search ..................... 428/650, 684, 428/416, 418, 425.8, 624, 626; 156/60, 325, 327, 330, 331.7

[56] References Cited

U.S. PATENT DOCUMENTS

| | | | |
|---|---|---|---|
| 4,855,001 | 8/1989 | Damico et al. | 156/307.3 |
| 5,079,094 | 1/1992 | Kimball | 428/416 |
| 5,162,156 | 11/1992 | Troughton, Jr. et al. | 428/460 |

OTHER PUBLICATIONS

Brockmann: "Interface Reactions and Their Influence on the Long–Term Properties of Metal Bonds"; Adhesives Age, vol. 20, No. 6, Jun. 1977, pp. 30–34; cited in the application see p. 33, middle column, line 6–page 34, middle column, line 31.

*Primary Examiner*—D. S. Nakarani
*Assistant Examiner*—Holly C. Rickman
*Attorney, Agent, or Firm*—Pillsbury Madison & Sutro LLP

[57] ABSTRACT

There is provided a composite article which comprises a first substrate comprising a body of metal containing aluminium or galvanised steel, a second substrate and, interposed between said first and second substrates whereby to provide adhesive bonding between said substrates, an adhesive and $2^1,3,4^1,5,7$-pentahydroxyflavone with the proviso that when either substrate is etched or anodised aluminium, the pentahydroxyflavone is not present thereon as a primer coat.

12 Claims, No Drawings

COMPOSITE ARTICLES

This application claims benefit of International application PCT/ GB94/ 02750, filed Dec. 16, 1994.

This invention relates to composite articles and more particularly to composite articles comprising at least two substrates bonded together by means of an intermediate layer of adhesive.

The adhesive bonding of substrates to form composite articles is a technology of increasing importance. By appropriate selection of adhesive, all solid substrates can be bonded although pretreatment of the substrate surfaces may be necessary in some cases.

Substrates which are commonly given a pretreatment include metals, the most frequently bonded metals being aluminium and steel. The pretreatments developed for metals generally have the effect not only of removing surface contaminants, for example lubricants, and oxide layers which may be intrinsically weak or may adhere poorly to the underlying metal, leading to weak joints in either case but also of providing a new oxide layer which is strong and which firmly adheres to the underlying metal. Established pretreatments include etching for steel and etching and/or anodising for aluminium.

In addition to the difficulties that can be experienced in attaining an acceptable initial bond strength, a significant problem associated with the use of adhesives on metal surfaces is the deterioration in bond strength that can occur over a period of time. This deterioration is exacerbated by high humidity and high temperatures.

Another method of improving the durability of adhesive bonded metal joints is to apply a primer to the metal surface and a number of primers have been proposed. In Adhesives Age, June 1977, pp 30–34, Brockmann describes the application of 8-hydroxyquinoline and 2',3,4',5,7-pentahydroxyflavone as primers on aluminium that has been either etched or etched and anodised and reports their effect on the ageing behaviour of bonds provided by phenolic and nitrile-epoxy adhesives. In all cases, it is said, the additional application of the primer increases the water-stability of the adhesive bond above that obtained by etching and anodising alone.

It has now been found that a similar improvement in the stability of the adhesive bond can be achieved when 2',3,4', 5,7-pentahydroxyflavone is applied as a primer to aluminium that has been neither etched nor anodised and this is not only economically advantageous but also surprising in view of the difficulties hitherto experienced in achieving acceptable bond strength between adhesive compositions and untreated aluminium. Galvanised steel can also be successfully treated. Furthermore, it has been found that similar effects can be obtained by merely incorporating pentahydroxyflavone as an additive in an adhesive resin, thus avoiding the extra step of applying it as a primer.

Thus, according to the invention, there is provided a composite article which comprises a first substrate comprising a body of metal containing aluminium or galvanised steel, a second substrate and, interposed between said first and second substrates whereby to provide adhesive bonding between said substrates, an adhesive and 2',3,4',5,7- pentahydroxyflavone with the proviso that when either substrate is etched or anodised aluminium, the pentahydroxyflavone is not present thereon as a primer coat.

The first and second substrates may have any shape or configuration provided that each has at least one surface suitable for being adhesively bonded to a surface of the other.

The metal constituting the first substrate may be aluminium in any of its known forms or galvanised steel in any of its known forms or an alloy of either metal. Suitable forms of aluminium include bare aluminium (having had no surface treatment), clad aluminium or aluminium that has been etched and/or anodised so long as the above proviso is observed. It is preferred, however, to avoid the use of etched or anodised aluminium because of the environmental hazards presented by etching and anodising processes. Suitable forms of galvanised steel include hot dipped or electrogalvanised grades.

The second substrate may comprise any solid material. In many cases, the second substrate will be substantially identical in composition with the first substrate, the composite article of the invention comprising, for example, two adhesively bonded sheets of aluminium or two adhesively bonded sheets of galvanised steel. In other cases, the second substrate may be a metal other than aluminium or steel or a non-metallic inorganic material, for example a ceramic material or it may be an organic material, for example a polymeric material.

Adhesives which may be present in the composite articles of the invention include known adhesive compositions such as have been described, for example, at pages 554–574 of Volume 1 of the Encyclopaedia of Polymer Science and Engineering, Second Edition (John Wiley and Sons 1985). Preferred adhesives are based on synthetic resin compositions, for example epoxy and polyurethane adhesive compositions such as have been fully described in the prior art.

The 2',3,4',5,7-pentahydroxyflavone (hereinafter referred to as PHF) may be present in the adhesive itself, preferably being uniformly distributed throughout a layer of adhesive, or, except where the metal is etched or anodised aluminium, it may be present on the surface of the metal adjacent to the adhesive as a primer coat. Effective amounts of PHF, when incorporated in an adhesive composition, are generally within the range from 0.01 to 5.0% by weight based on the weight of adhesive.

The composite articles of the invention may be prepared by interposing an adhesive and PHF between the first and second substrates and curing said adhesive in contact with at least part of a surface of each substrate provided that when either substrate is etched or anodised aluminium, the PHF is not applied thereto as a primer coat.

A preferred method of making the composite articles of the invention comprises applying an adhesive and PHF to at least part of a surface of a body of metal comprising aluminium or galvanised steel, bringing at least part of a surface of a second substrate into contact with said adhesive and curing the adhesive provided that when the metal is etched or anodised aluminium, the PHF is not applied thereto as a primer coat.

In one embodiment, the method of making the composite articles of the invention comprises applying an adhesive composition comprising an adhesive and from 0.01 to 5.0% by weight, based on the weight of the adhesive, of PHF to at least part of a surface of a body of metal comprising aluminium or galvanised steel, bringing at least part of a surface of a second substrate into contact with said adhesive composition and curing the adhesive composition.

In a further embodiment, the method of making the composite articles of the invention comprises applying a PHF primer coat to at least part of a surface of a body of metal comprising aluminium, other than etched or anodised aluminium, or galvanised steel, applying an adhesive to the primer coated surface, bringing at least part of a surface of a second substrate into contact with said adhesive and curing the adhesive.

Before applying a primer coat to or contacting an adhesive with a metal surface in making the composite articles of the invention, such surface will preferably be subjected to a conventional degreasing treatment, for example by treating said metal surface with the vapour of a halogenated hydrocarbon.

When the PHF is applied as a primer to a surface of the first substrate, it may be applied as a solution in a solvent such as ethanol. Application of the solution may be by spraying, dipping or brushing. Where the second substrate also comprises a body of metal such as aluminium or galvanised steel, a primer coat, when applied to the first substrate, will generally also be applied to the second substrate, except when that second substrate is etched or anodised aluminium.

Application of the adhesive may be effected in a conventional manner using, for example, a brushing, spraying or coating technique. Preferred adhesives include polyurethane and epoxy adhesives of the types described in the prior art, for example in the aforementioned Encyclopaedia of Polymer Science and Engineering. Such adhesives may contain conventional auxiliary agents such as catalysts, hardeners, fillers and the like. Curing of the adhesive may be effected in a conventional manner, for example by the application of elevated temperatures, and pressure may be applied to the substrates as necessary to facilitate the production of a strong adhesive bond.

The composite articles of the invention may be used on structural components in the constructional and transportation industries.

The invention is illustrated but not limited by the following Examples in which all metal substrates were first degreased in 1,1,1-trichloroethane vapour before further treatment. All bond shear strengths are the average of 4–5 replicates.

EXAMPLE 1

Adhesive joints were prepared by the application of an epoxy resin adhesive (Araldite 2007 ex Ciba-Geigy) to aluminium panels (2024 T3 clad aluminium, 25×102×1.5 mm, ex Q-Panel, Bolton, U.K.) that had been pretreated with PHF.

In one case, an aluminium panel was immersed in a 0.1% ethanol solution of PHF at 50° C. for 3 hours and then rinsed with clean ethanol and allowed to air dry.

In another case, a 0.01% ethanol solution of PHF was applied to the aluminium surface from a pipette (16 μl of solution applied to an area of 25 mm×25 mm, two coats applied) and allowed to dry at room temperature. Other panels were treated in the same way using 0.1% and 0.5% solutions of PHF in ethanol.

The joint had a bond overlap of 12.5 mm and a thickness of 0.2 mm achieved by sprinkling 0.2 mm Ballotini beads on to the adhesive before making the joint. Pressure was maintained during the cure schedule (160° C./1 hour) with the aid of a bulldog clip.

The shear strengths, initially and after immersion in distilled water at 50° C., are given in the following Table. A Monsanto T20 Tensometer was used for all test

| Surface Pretreatment | Shear strength (MPa) and locus of failure Time immersed in water at 50° C. (hour) | | | | |
| --- | --- | --- | --- | --- | --- |
| | 0 | 240 | 500 | 1500 | 3000 |
| None | 39.7 | 28.0 | 26.7 | 25.4 | 10.8 A |
| PHF (immersion) | 42.6 | 29.1 | 32.2 | 32.2 | 26.1 C = A |
| PHF (solution 0.01%) | 41.2 | 29.9 | 27.5 | 26.3 | 14.8 A > > C |
| PHF (solution 0.1%) | 39.4 | 31.1 | 32.5 | 31.9 | 22.5 C = A |
| PHF (solution 0.5%) | 40.7 | 34.6 | 32.5 | 32.4 | 25.0 C = A |

A = adhesive failure
C = cohesive failure

EXAMPLE 2

Adhesive joints were prepared by the application of a polyurethane adhesive (Tivo 9700/5, a reactive hot melt adhesive ex Tivoli Werke, Hamburg) to aluminium panels (described in Example 1) that had been pretreated by immersion in a 0.1% ethanolic solution of PHF as described in Example 1.

A bond thickness of 2 mm was achieved using PTFE spacers and the bond length was approximately 25 mm. Each bond was measured after testing to determine the bond length accurately. Pressure was maintained during the cure schedule (180° C./30 minutes) with the aid of a bulldog clip.

The shear strengths, initially and after holding for specified times in a salt spray cabinet (5% NaCl solution/35° C.), are given in the following Table.

| Surface Pretreatment | Shear strength (MPa) and locus of failure Time in salt spray (hour) | | |
| --- | --- | --- | --- |
| | 0 | 500 | 1000 |
| None | 4.8 C | 0.2 A | — |
| PHF (solution 0.1%) | 4.7 C | 4.1 C | 3.7 C |

EXAMPLE 3

Adhesive joints were prepared by the application of a polyurethane adhesive (Tivo 9700/5, described in Example 2) containing 1% by weight of PHF to various substrates (identified below). Bonds and curing were as described in Example 2.

The shear strengths, initially and after immersion in distilled water at 50° C., are given in the following Table.

| Adhesion Promoter | Substrate | Shear strength (MPa) and locus of failure Immersion Time (hour) in water at 50° C. | |
| --- | --- | --- | --- |
| | | 0 | 1000 |
| None | FD | 3.1 | 2.2 A |
| | ELO | 2.7 | 2.1 A |
| | Al | 3.2 | 2.7 C |
| PHF | FD | 3.1 | 2.8 C |
| | ELO | 3.6 | 3.2 C |
| | Al | 3.8 | 3.5 C |

FD = hot dipped galvanised steel (St 05Z 140 MC, 25 × 100 × 1.05 mm, ex Thyssen Stahl AG)
ELO = electrogalvanised steel (St 14ZE 100/100 05 OL, 25 × 100 × 1.0 mm, ex Hoesch Stahl AG)
Al = 2024 T3 clad aluminum described in Example 1

EXAMPLE 4

Adhesive formulations were prepared having the compositions detailed in the following Table.

|   | 1 | 2 | 3 | 4 | 5 | 6 |
|---|---|---|---|---|---|---|
| 1.Epoxy Adduct | 29.12 | 29.12 | 29.12 | 29.12 | 29.12 | 29.12 |
| 2.Winnofil SPT ex ICI Resins | 35.40 | 35.70 | 35.80 | 35.90 | — | — |
| 3.Dicy MF ex Anchor | 3.48 | 3.48 | 3.48 | 3.48 | 3.48 | 3.48 |
| 4.Curazol 2MZ Azine ex Anchor | 0.88 | 0.88 | 0.88 | 0.88 | 0.88 | 0.88 |
| 5.Zinc Oxide ex Durham Chemicals | 1.00 | 1.00 | 1.00 | 1.00 | — | — |
| 6.PHF Hydrate ex Aldrich | 0.50 | 0.20 | 0.10 | — | — | 0.63 |
| 7.Epoxy Adduct | 29.12 | 29.12 | 29.12 | 29.12 | 29.12 | 29.12 |
| 8.Wacker HDK N20 ex Wacker Chemie | 0.50 | 0.50 | 0.50 | 0.50 | — | — |

Before use, the PHF was dried overnight in an oven at 105° C., then ground and passed through a 53 $\mu$ sieve.

The formulations were prepared by first mixing items and 1 and 2 at 600 mm Hg for 10 minutes and, after stopping the stirrer and releasing the vacuum, adding items 3–6. Mixing was then continued for 1 hours at 600 mm Hg and, after stopping the stirrer and release the vacuum, items 7 and 8 were added. Mixing was continued for a further 15 minutes at 600 mm Hg.

The epoxy adduct was prepared by stirring together 270 g of an epoxy resin (DER 331, ex Dow), 500 g of a second epoxy resin (DER 351, ex Dow) and 230 g of a polyether diamine (Jeffamine D2000 ex Texaco) for 4 hours at 50° C.

Winnofil SPT is calcium carbonate

Dicy MF is dicyandiamide (curing agent)

Curazol 2MZ is an imidazole triazine derivative (accelerator)

Wacker HDK N20 is fumed silica

Shear strengths of joints made from the above adhesive formulations, initially and after immersion in distilled water at 50° C., are given in the following Table.

| | Shear strength (MPa) and locus of failure Time immersed in water at 50° C. (hour) | | |
|---|---|---|---|
| Formulation | 0 | 500 | 1000 |
| 1 | 20.00 A | 13.84 C + A | 13.17 A + C |
| 2 | 23.17 C | 17.25 C + A | 15.21 A + C |
| 3 | 22.75 C | 17.74 C + A | 14.72 A + C |
| 4 | 22.08 C | 15.57 C + A | 14.20 A + C |
| 5 | 14.0 C | — | 4.8 A |
| 6 | 14.8 C | — | 7.0 A + C |

We claim:

1. a composite article which comprises a first substrate comprising a body of metal containing aluminium or galvanised steel, a second substrates and, interposed between said first and second substrates whereby to provide adhesive bonding between said substrates, an adhesive having $2^1$, $3,4^1$, $5,7$-pentahydroxyflavone incorporated therein with the proviso that neither substrate is etched or anodised aluminium.

2. A composite article according to claim 1 wherein the second substrate is substantially indentical in composition with the first substrate.

3. A composite article according to claim 1 or claim 2 wherein the adhesive comprises a synthetic resin composition.

4. A composite article according to claim 3 wherein the synthetic resin composition comprises an epoxy or polyurethane adhesive composition.

5. A method of making a composite article as defined in claim 1 which comprises interposing an adhesive having $2^1$, $3,4^1$, $5,7$-pentahydroxyflavone incorporated therein between the first and second substrates and curing said adhesive which is in contact with at least part of a surface of each substrate provided that neither substrate is etched or anodised aluminium.

6. A method according to claim 5 which comprises applying an adhesive having $2^1$, $3,4^1$, $5,7$-pentahydroxyflavone incorporated therein to at least part of a surface of a body of metal comprising aluminium or galvanised steel, bringing at least part of a surface of a second substrate into contact with said adhesive and curing the adhesive provided that neither substrate is etched or anodised aluminium.

7. A method according to claim 6 which comprises applying an adhesive composition comprising an adhesive having incorporated therein from 0.01 to 5% by weight, based on the weight of the adhesive, of $2^1$, $3,4^1$, $5,7$-pentahydroxyflavone to at least part of a surface of a body of metal comprising aluminium or galvanised steel, bringing at least part of a surface of a second substrate into contact with said adhesive composition and curing the adhesive composition.

8. A method of preparing a composite article which comprises a first substrate of aluminium or galvanised steel, a second substrate and interposed between said first and second substrates whereby to provide adhesive bonding between said substrates, an adhesive and $2^1$, $3,4^1$, $5,7$-pentahydroxyflavone, said method comprising applying a primer coat comprising said $2^1$, $3,4^1$, $5,7$-pentahydroxyflavone to at least part of a surface of said first substrate, applying said adhesive to the primer coated surface, bringing at least part of a surface of said second substrate into contact with said adhesive and curing the adhesive, said first and second substrates being other than etched or anodised aluminium.

9. A method according to claim 5 or claim 8 wherein the second substrate comprises a body of metal containing aluminium or galvanised steel other than etched or anodised aluminium.

10. A composite article according to claim 1 or claim 4 wherein the adhesive resin composition includes from 0.01 to 5.0% by weight of the flavone based on the weight of the adhesive resin composition.

11. A composite article according to claim 10 wherein the first substrate comprises galvanised steel.

12. A method according to claim 9 wherein the primer coat comprises from 0.01 to 5.0% by weight of the flavone based on the weight of the said primer coat.

\* \* \* \* \*